United States Patent
Desai et al.

(10) Patent No.: US 8,661,825 B2
(45) Date of Patent: Mar. 4, 2014

(54) PEGLESS SECONDARY FUEL NOZZLE INCLUDING A UNITARY FUEL INJECTION MANIFOLD

(75) Inventors: Divyang Rajendra Desai, Karnataka (IN); Sandeep Gopalakrishna, Karnataka (IN); Kodukulla Venkat Sridhar, Karnataka (IN); Amit Monga, Karnataka (IN)

(73) Assignee: General Electric Company, Schenectady, NY (US)

( * ) Notice: Subject to any disclaimer, the term of this patent is extended or adjusted under 35 U.S.C. 154(b) by 707 days.

(21) Appl. No.: 12/971,312

(22) Filed: Dec. 17, 2010

(65) Prior Publication Data

US 2012/0151927 A1    Jun. 21, 2012

(51) Int. Cl.
| | |
|---|---|
| *F02C 1/00* | (2006.01) |
| *F02G 3/00* | (2006.01) |
| *F23R 3/34* | (2006.01) |
| *F23R 3/28* | (2006.01) |
| *F02C 7/22* | (2006.01) |

(52) U.S. Cl.
CPC .............. *F23R 3/343* (2013.01); *F23R 3/286* (2013.01); *F02C 7/222* (2013.01)
USPC ............... 60/748; 60/737; 60/746; 60/747; 60/739

(58) Field of Classification Search
CPC .............. F23R 3/283; F23R 3/14; F23R 3/28; F23R 3/343; F23R 3/286; F02C 7/222
USPC ............... 60/737, 746, 747, 748, 739
See application file for complete search history.

(56) References Cited

U.S. PATENT DOCUMENTS

| 5,101,633 | A  | * | 4/1992  | Keller et al. ................. 60/737 |
|---|---|---|---|---|
| 5,193,346 | A  |   | 3/1993  | Kuwata et al. |
| 5,199,265 | A  |   | 4/1993  | Borkowicz |
| 5,540,056 | A  | * | 7/1996  | Heberling et al. ............ 60/737 |
| 6,675,581 | B1 |   | 1/2004  | Stuttaford et al. |
| 6,837,052 | B2 |   | 1/2005  | Martling |
| 6,898,937 | B2 | * | 5/2005  | Stuttaford et al. ............ 60/737 |
| 7,677,472 | B2 | * | 3/2010  | Hessler ........................ 239/424 |
| 7,707,833 | B1 | * | 5/2010  | Bland et al. .................. 60/737 |
| 8,079,218 | B2 | * | 12/2011 | Widener ....................... 60/742 |
| 8,113,001 | B2 | * | 2/2012  | Singh et al. .................. 60/742 |
| 8,474,265 | B2 | * | 7/2013  | Jain et al. ..................... 60/742 |
| 2004/0118119 | A1 | * | 6/2004  | Martling et al. .............. 60/737 |
| 2004/0177615 | A1 | * | 9/2004  | Martling ....................... 60/740 |
| 2011/0131998 | A1 | * | 6/2011  | Nadkarni et al. ............. 60/737 |
| 2011/0162371 | A1 | * | 7/2011  | Khan et al. ................... 60/737 |

* cited by examiner

*Primary Examiner* — William H Rodriguez
(74) *Attorney, Agent, or Firm* — Ernst G. Cusick; Frank A. Landgraff

(57) ABSTRACT

A unitary fuel injection manifold for a secondary fuel nozzle improves fuel-air mixing and offers flexibility to alter the mixing profile through adaptability to a variety of number, types, and orientation of discharge outlets to the combustion air mixing space around the secondary fuel nozzle. An aerodynamic surface with reduced extension into the mixing space reduces pressures drop and interference with design airflow. Manifold integrity is enhanced by elimination of fillet welds to mount external pegs.

19 Claims, 7 Drawing Sheets

(Section A-A)

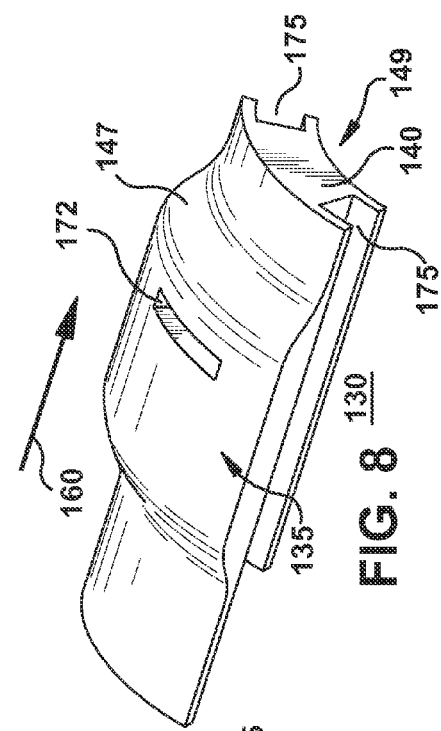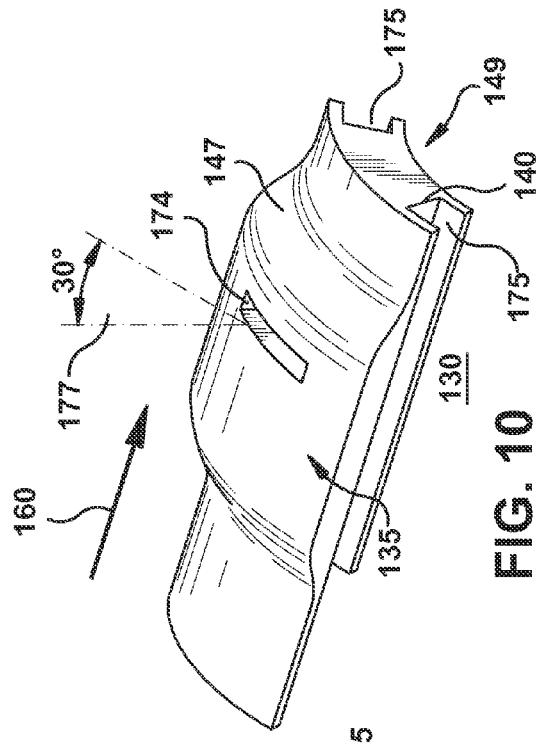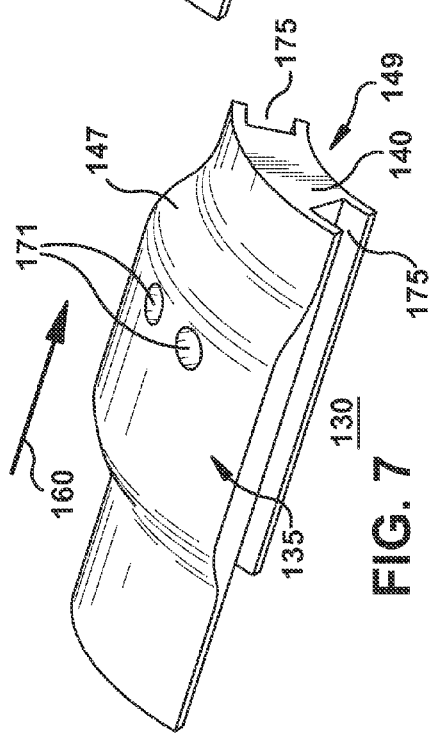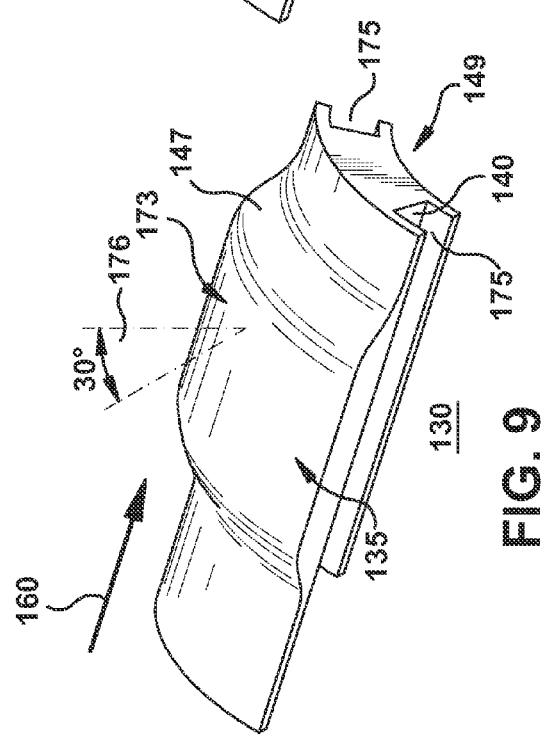
FIG. 7
FIG. 8
FIG. 9
FIG. 10

PEGLESS SECONDARY FUEL NOZZLE INCLUDING A UNITARY FUEL INJECTION MANIFOLD

BACKGROUND OF THE INVENTION

The invention relates generally to gas turbines and more specifically to gas turbine combustors with secondary fuel nozzles.

Gas turbine manufacturers continue research and engineering programs to produce new gas turbines that will operate at high efficiency without producing undesirable air polluting emissions. The primary air polluting emissions usually produced by gas turbines burning conventional hydrocarbon fuels are oxides of nitrogen, carbon monoxide, and unburned hydrocarbons. It is well known in the art that oxidation of molecular nitrogen in air breathing engines is highly dependent upon the maximum hot gas temperature in the combustion system reaction zone. The rate of chemical reactions forming oxides of nitrogen (NOx) is an exponential function of temperature. If the temperature of the combustion chamber hot gas is controlled to a sufficiently low level, thermal NOx will not be produced.

One preferred method of controlling the temperature of the reaction zone of a heat engine combustor below the level at which thermal NOx is formed is to premix fuel and air to a lean mixture prior to combustion. The thermal mass of the excess air present in the reaction zone of a lean premixed combustor absorbs heat and reduces the temperature rise of the products of combustion to a level where thermal NOx is not formed.

Lean, premixing fuel injectors for emissions abatement are in common use throughout the industry, having been reduced to practice in heavy duty industrial gas turbines for more than two decades. Such devices have achieved great progress in the area of gas turbine exhaust emissions abatement. Reduction of oxides of nitrogen, NOx, emissions by an order of magnitude or more relative to the diffusion flame burners of prior art have been achieved without the use of diluent injection such as steam or water.

A common configuration for combustors in gas turbines provides an annular array of primary nozzles each of which discharges fuel into the primary combustion chamber, and a central secondary nozzle which discharges fuel into the secondary combustion chamber. The secondary nozzle has an axial fuel delivery pipe surrounded at its discharge end by an air swirler which provides combustion air to the fuel nozzle discharge. Often the secondary nozzle is operated as a two-stage (diffusion and premixing) gas only secondary fuel nozzle with two fuel circuits. This allows the nozzle to operate in a premixed mode or diffusion mode. The secondary nozzle of each combustor is located within a center body and extends through a liner provided with a swirler through which combustion air is introduced for mixing with fuel from the secondary nozzle. The secondary nozzle is arranged to discharge fuel into a throat region between an upstream primary combustion chamber and a downstream secondary combustion chamber. Fuel is supplied to the secondary nozzle through concentrically arranged diffusion and premix pipes.

FIG. 1 illustrates a premixing section of a prior art secondary fuel nozzle assembly 5. The premixing section 10 includes multiple pegs 15 fixed to an outer surface 16 of outer wall 17 of the fuel nozzle body 20, each with a fillet weld 18. The multiple pegs 15 extend radially outward from the fuel nozzle body and around the circumference at discrete locations. Radially internal to the fuel nozzle wall 17 are multiple secondary manifolds 25, each manifold disposed between an inner surface 19 of the fuel nozzle wall 17 and a support structure 22 radially inward. Also radially inward from the secondary manifolds 25 are fuel chambers 30, which may be supplied with fuel from a rear portion (not shown) of the secondary fuel nozzle assembly. The secondary manifold 25 may include radial passages 26 from the fuel chamber 30 below, communicating through the fuel nozzle wall 17 and through the peg 15. The radial passages communicate with discharge passages 27 and through fuel injection holes 28 into the premixing space 40 around the fuel nozzle body 20. The pegs 15 interrupt the distribution of airflow 45 and result in uneven radial and circumferential mixing of fuel and air. Further, due to the size and their far reach into the premixing space 40, the pegs 15 cause an undesired pressure drop.

Accordingly, there is a need to provide a premixing arrangement for the secondary fuel nozzle that is simple and exercises improved control over fuel-air mixing.

BRIEF DESCRIPTION OF THE INVENTION

A first aspect of the present invention provides a secondary fuel nozzle for a combustor of a gas turbine where the combustor provides a downstream combustion airflow within a fuel-air premixing space around the secondary fuel nozzle. The secondary fuel nozzle includes an elongated tube body with a fuel source end and a tip end. The nozzle also includes a unitary fuel injection manifold for premixing fuel with downstream combustion airflow. The fuel injection manifold is formed in a generally annual shape body shape within the elongated tube body and disposed between the fuel source end and the tip end. The fuel injection manifold extends radially from internal to the elongated tube body to radially above and external to the elongated tube body. The manifold extends circumferentially fully around the elongated nozzle body in a fuel-air premixing space external to the elongated tube body. The secondary fuel nozzle also includes a fuel passage from a fuel source end of the elongated tube body to the fuel injection manifold, supplying premixing fuel to the unitary fuel injection manifold. Multiple fuel channels provide for fluid communication for the premixing fuel between the premixing fuel passage within the elongated tube body and multiple fuel discharge outlets on the outer surface of the unitary fuel injection manifold. The fuel channels for the premixing fuel are circumferentially organized around the annular body of the fuel injection manifold.

According to another aspect of the present invention, a combustor for a gas turbine including a turbine and a compressor is provided. The combustor includes a secondary fuel nozzle organized along an axial centerline of the combustor and at least one primary fuel nozzle surrounding the secondary fuel nozzle. A backplate supplies one or more fuel sources to the primary nozzles and the secondary fuel nozzle. The combustor provides a combustion air supply from a compressor to the primary fuel nozzles and the secondary fuel nozzle.

The secondary fuel nozzle includes an elongated body tube having a fuel supply end with an opposing tip end. The elongated body tube includes multiple internal passages formed in concentric tubes delivering air and fuel to a tip nozzle and to a tip swirler. A unitary fuel injection manifold is provided for premixing fuel with downstream combustion air flow. The fuel injection manifold is formed in a generally annual body shape within the elongated tube body and disposed between the fuel source end and the tip end. The fuel injection manifold extends radially from internal to the elongated tube body to radially above and circumferentially fully around in a fuel-air premixing space external to the elongated tube body. The body of the fuel injection manifold disposed radially above the elongated tube body forms an aerodynamically streamlined outer surface for combustion air in the premixing space. The axial ends of the outer surface of the fuel injection manifold smoothly taper in radially for attachment to an outer radial surface of the elongated tube body.

A fuel passage from a fuel source end of the elongated tube body to a proximity of the fuel injection manifold supplies premixing fuel to the unitary fuel injection manifold. Multiple fuel channels provide fluid communication between the premixing fuel passage within the elongated tube body and multiple fuel discharge outlets on the outer surface of the unitary fuel injection manifold. The multiple fuel channels are circumferentially disposed around the body of the fuel injection manifold.

Briefly in accordance with a further aspect of the present invention, a fuel injection manifold for a premixing fuel of a secondary fuel nozzle of a combustor of a gas turbine is provided. The fuel injection manifold includes a unitary body forming a generally annular segment of a nozzle tube for a secondary fuel nozzle of a gas turbine. The unitary body includes an inner radial section for mounting within the nozzle tube and a radially elevated portion with an aerodynamically shaped outer surface for extending above the outer surface of the nozzle tube into a premixing space of the secondary fuel nozzle. The unitary body is supplied with a premixing fuel source from within the nozzle tube.

Multiple fuel injection channels in the unitary body establish a fluid communication path for the premixing fuel from the fuel source within the nozzle tube to fuel discharge opening in the premixing space radially surrounding the nozzle tube. One or more fuel discharge outlets to the premixing space surrounding the nozzle tube are provided for each of the fuel channels. The fuel discharge openings are adapted for enhancing mixing of the fuel with a combustion airflow in the premixing space.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 7 illustrates an isometric view of an embodiment of a fuel injection arrangement where the manifold includes two holes normal to the airflow;

FIG. 8 illustrates an embodiment of fuel injection arrangement with a rectangular slot normal to the airflow;

FIG. 9 illustrates an embodiment of a fuel injection arrangement with a rectangular slot including a 30-degree backward discharge angle to the airflow;

FIG. 10 illustrates an embodiment of a fuel injection arrangement with a rectangular slot including 30-degree forward discharge angle to the airflow.

DETAILED DESCRIPTION OF THE INVENTION

The following embodiments of the present invention have many advantages including eliminating pegs that extend far into the fuel flow around the nozzle body, and exercising improved control over the over the fuel-air mixing without extending into the combustion airflow with the attendant obstruction to the airflow pattern that result with pegs. Embodiments of the present invention integrate fuel injection holes into a fuel injection manifold of the nozzle body. The fuel injection manifold is made simple and more robust by eliminating the pegs and the associated fillet weld between the nozzle body and pegs. The inventive arrangement further provides ease of manufacturability, retrofitability and low-cost.

Figure 1:
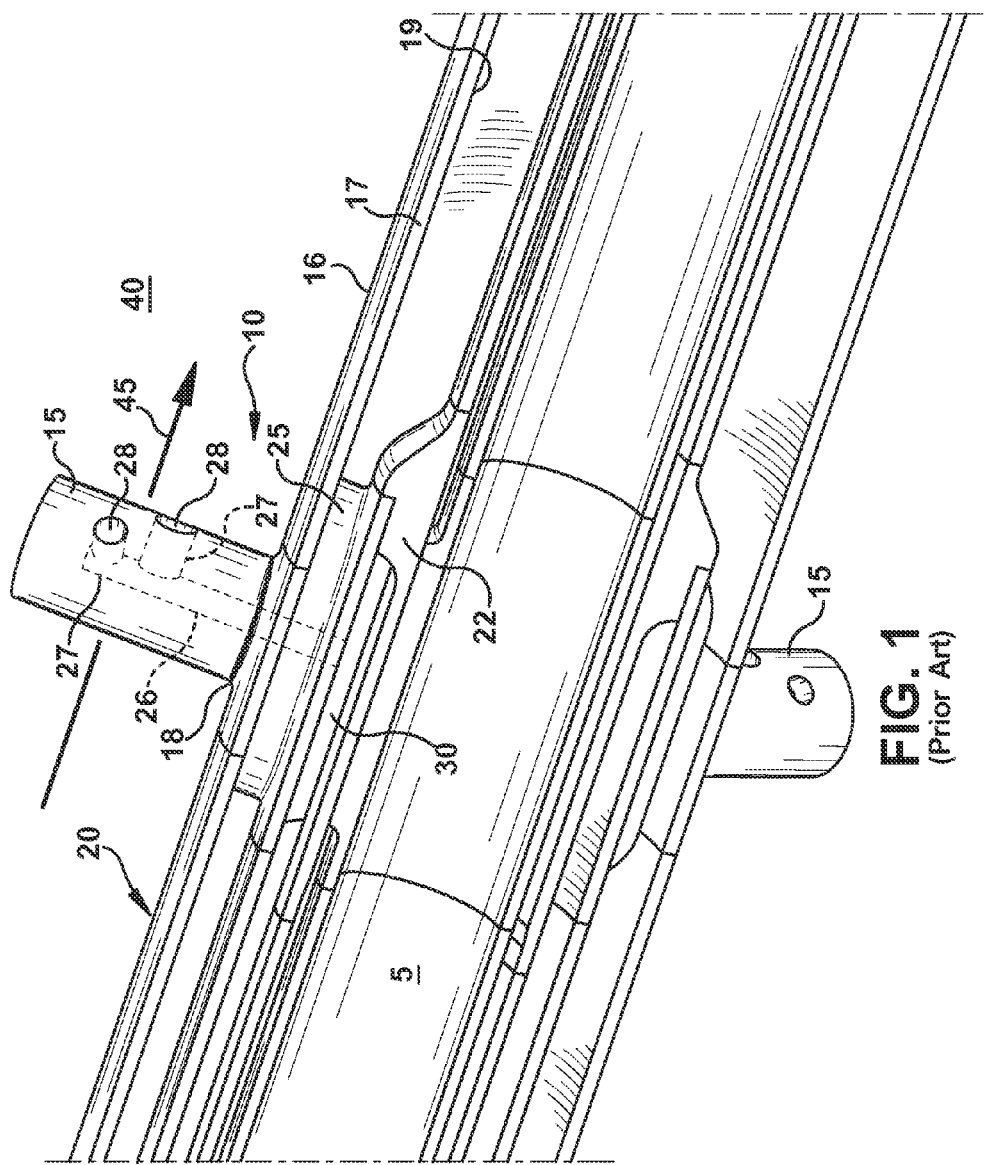
FIG. 1 illustrates a premixing section of a prior art secondary fuel nozzle assembly.
Figure 2:
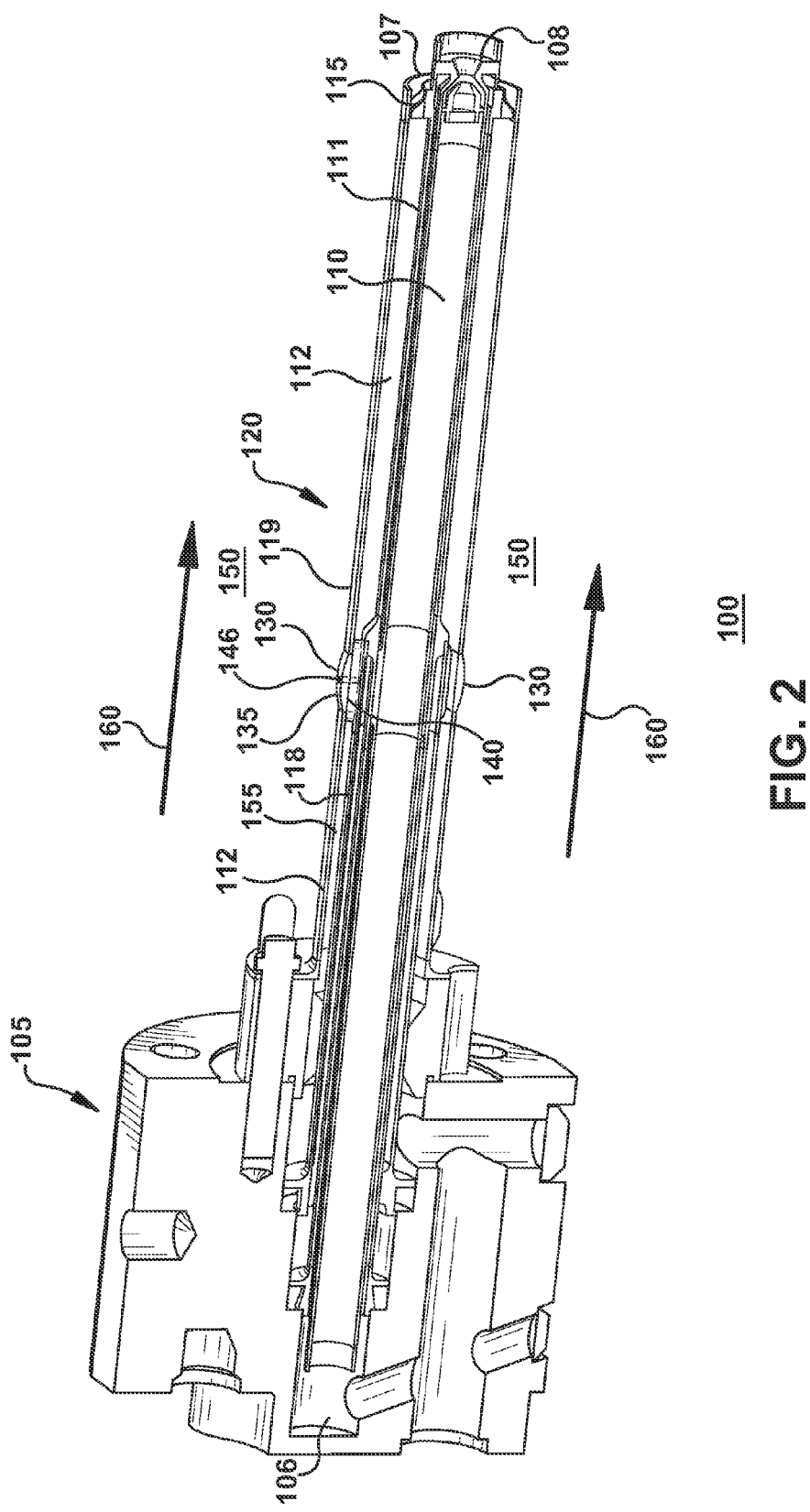
FIG. 2 illustrates an embodiment of a secondary fuel nozzle including an inventive fuel injection manifold.

FIG. 2 illustrates an embodiment of a secondary fuel nozzle 100 with an inventive fuel injection manifold 130. The secondary fuel nozzle includes a base section 105 that includes provisions for attachment to a combustor of a gas turbine and which supplies fuel and air to an elongated nozzle body 120. The elongated nozzle body includes a base end 106 and a tip end 107. The tip end 107 includes a nozzle tip 108 supplied by a center fuel passage 110 and an air passage 111 for cooling air for the nozzle tip 108. The tip end 107 further includes an air swirler 115 taking air from air passage 112 outside radially from the nozzle tip 108 for establishing a swirling fuel-air mixture downstream. Along a length of the elongated nozzle body 120, a fuel injection manifold 130 is provided for injecting fuel into air stream 160 of premixing section 150. The fuel injection manifold 130 is unitary. An outer portion 135 of the fuel injection manifold extends aerodynamically outward radially from the outer wall 119 of the elongated nozzle body 120 and circumferentially around the elongated nozzle body. An inner portion 140 of the fuel injection manifold extends radially into the elongated nozzle body and is supported from an inner structure below. The fuel injection manifold 130 may be butt-welded to upstream and downstream sections of the outer tube wall 119 and third tube wall 118.

Figure 3:
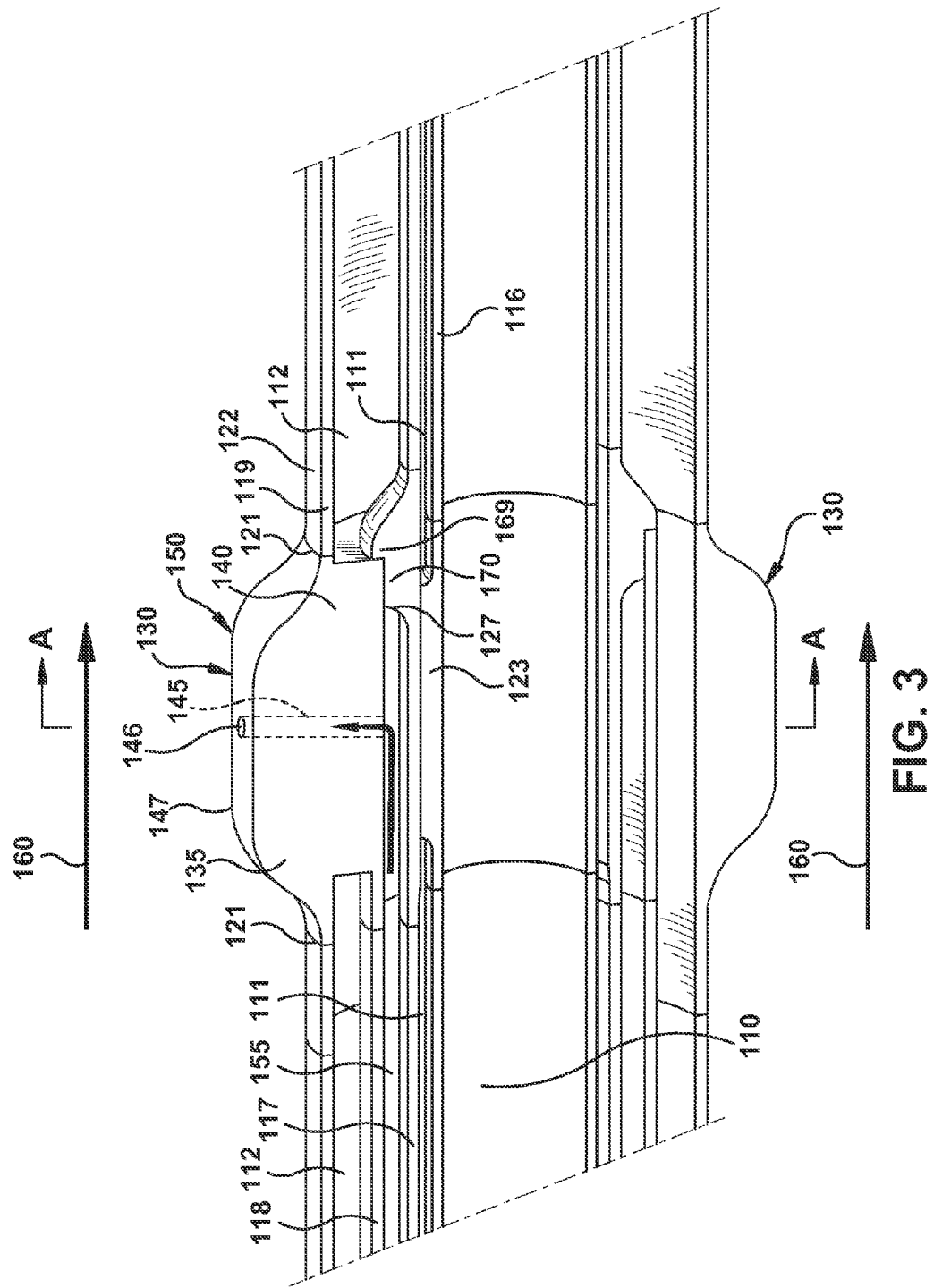
FIG. 3 illustrates FIG. an expanded isometric cutaway view for an embodiment of the unitary fuel injection manifold of the elongated nozzle body.
Figure 4:
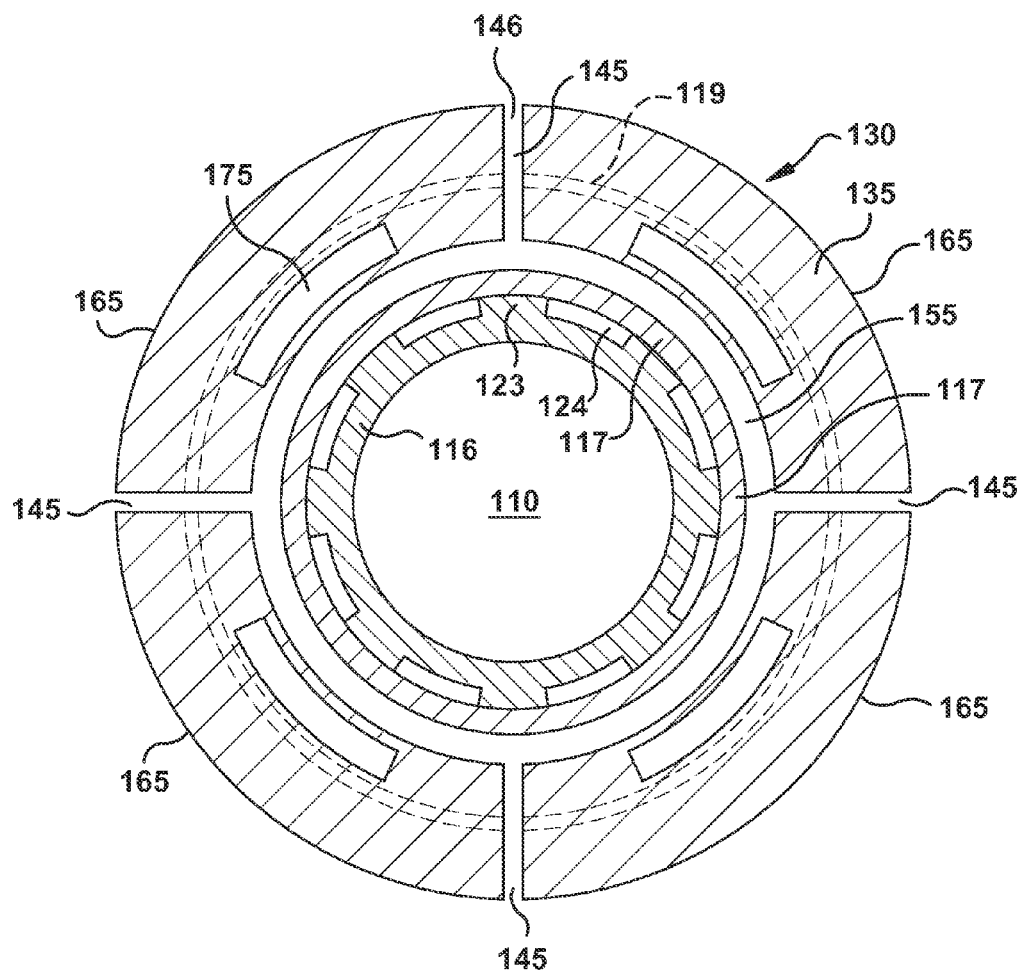
FIG. 4 illustrates a cross-section A-A through a center of an embodiment of the fuel injection manifold section of the elongated nozzle body.

FIG. 3 illustrates an expanded isometric cutaway view for an embodiment of the unitary fuel injection manifold 130 of the elongated nozzle body. FIG. 4 illustrates a cross-section A-A through a center of the fuel injection manifold section of the elongated nozzle body. The center fuel passage 110 providing fuel to the nozzle tip (FIG. 2) is enclosed by first tube wall 116. The second annular passage 111 supplying air to the nozzle tip is enclosed by second tube wall 117. The third annular passage 155 supplying premix fuel to the fuel injection manifold 130 is enclosed by third tube wall 118. The fourth annular passage 112 supplying air to swirler (FIG. 2) at tip end of nozzle is enclosed by outer wall 119. The fuel injection manifold is formed as an annular ring. The annular ring includes a smoothed aerodynamic exterior protrusion 135, radially elevated relative to outer surface 122 of outer wall 119. Axial ends of the protrusion 135 smoothly taper inward radially to the outer surface 122 of the adjacent outer wall 119. The internal body section 140 of unitary fuel injection manifold 130 extends inward radially relative to the adjacent outer wall 119. Circumferential quadrants 165 of fuel injection manifold include axial air channels 175 allowing air to pass between upstream and downstream portions of air passages 112. Between quadrants 165, radial fuel channels 145 provide fuel for premixing from fuel channel 155 to fuel discharge outlets 146 into the combustion airstream 160 outside the outer surface of 147 of the manifold.

Annular support elements 123 may extend radially outward at circumferential sectors of the center tube section 116 providing support for and separation from the second tube wall 117. Air channels through the fuel manifold section are disposed circumferentially between support elements 123 and radially between center wall 116 and second tube wall 117. The air channels connect upstream and downstream portions of air passages 111.

Figure 5:
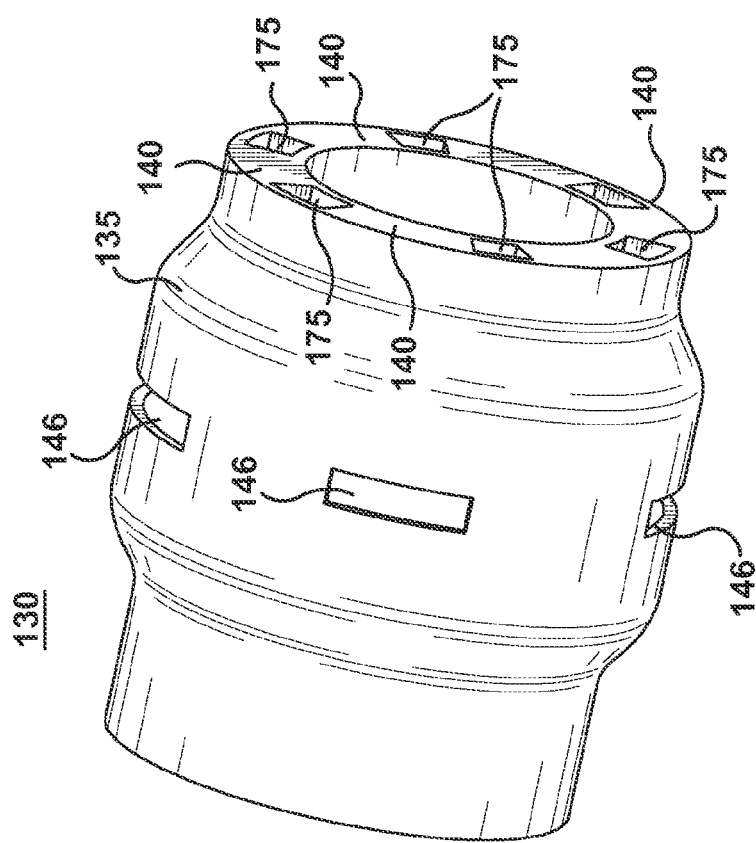
FIG. 5 illustrates an isometric exterior view of an embodiment of a fuel injector manifold cutoff on downstream side.

Support ring 170 may extend between second tube wall 117 and underside 124 of internal body 140 of fuel injection manifold. The support ring 170 may radially support the downstream side of internal body 140 of the manifold. The support ring 170 may further act provide endwall 127 for premix fuel passage 155. Outer radial ring part 169 may further provide a firm seat for downstream end of internal body 140 of fuel injection manifold FIG. 5 illustrates an isometric end view of an embodiment of a fuel injector manifold 130 cutoff on downstream side. The raised exterior portion 135 include may include a plurality of fuel discharge outlets 146 (shown as slots). In this example, four fuel discharge outlets 146 are illustrated. The downstream end of fuel injector manifold includes inner manifold body 140 through which fuel discharge channels (not shown) supply fuel to the fuel discharge outlets 146. Air passages 175 are provided through the fuel injector manifold to supply air to swirler (FIG. 2) at the tip end of the elongated nozzle body.

Figure 6:
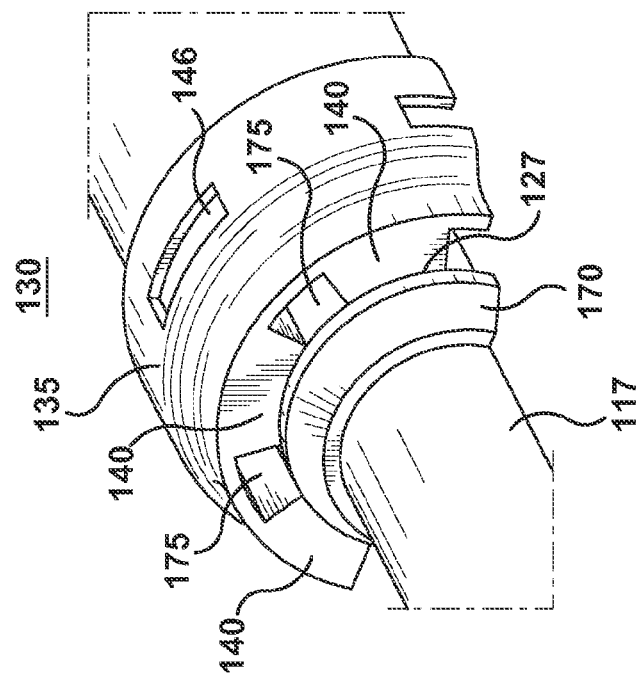
FIG. 6 illustrates a downstream cutaway interface for an embodiment of the fuel injector manifold 130 with support ring.

FIG. 6 illustrates a downstream cutaway interface of the fuel injector manifold 130 with support ring 170. Support ring 170 may extend between second tube wall 117 and underside of internal manifold part 140, providing support for the underside of inner manifold body 140 and providing an endwall 127 for fuel passage 155 (FIG. 3) supplying manifold fuel injection passages 145 (FIG. 4).

It should be understood that many embodiments of the inventive manifold body may be provided for fuel premixing in an elongated nozzle body with different combinations and types of internal fuel flows and air flows within the nozzle body and that such alternate arrangements are considered within the scope of the present invention.

FIG. 7 illustrates an isometric end view the fuel injection manifold 130 without inner secondary fuel nozzle components. Here it may be seen that the exterior body 135 of the fuel injection manifold includes a smooth exterior surface 147 for reducing interference with the combustion airflow 160 around the elongated nozzle body (not shown). Internal body sections 140 of the fuel injection manifold are interspersed with air channel 175 allowing fluid communication for air in passage 112 (FIG. 2) from the upstream end of the elongated nozzle body to the tip end swirler (FIG. 2). Fuel injection outlets 146 are disposed circumferentially around the manifold in locations with internal body sections 140.

FIG. 8 illustrates a fuel injection arrangement with a rectangular slot 172 normal to the combustion airflow 160. FIG. 9 illustrates a fuel injection arrangement with a rectangular slot 173 including a 30-degree backward discharge angle 176 to the combustion airflow. FIG. 10 illustrates a fuel injection arrangement with a rectangular slot 174 including 30-degree backward discharge angle 177 to the combustion airflow 160. It should be understood that arrangements may be provided with openings of different shapes, number of openings and direction of discharged fuel relative to the combustion airflow. It should also be understood that the fuel nozzle body may also be provided with varying numbers of secondary manifold internal body elements 140 and air passages 175 circumferentially distributed.

The size, shape and orientation of fuel injection openings from the secondary manifold segments, as well as the number of circumferentially distributed secondary manifold segments will influence the radial and circumferential fuel-air mixing. Performance of the various arrangements of FIGS. 7-10 may be compared favorably against a baseline performance of the peg arrangement as to equivalence, a radial profile of phi (1/equivalence ratio) and unmixedness.

Figure 11:
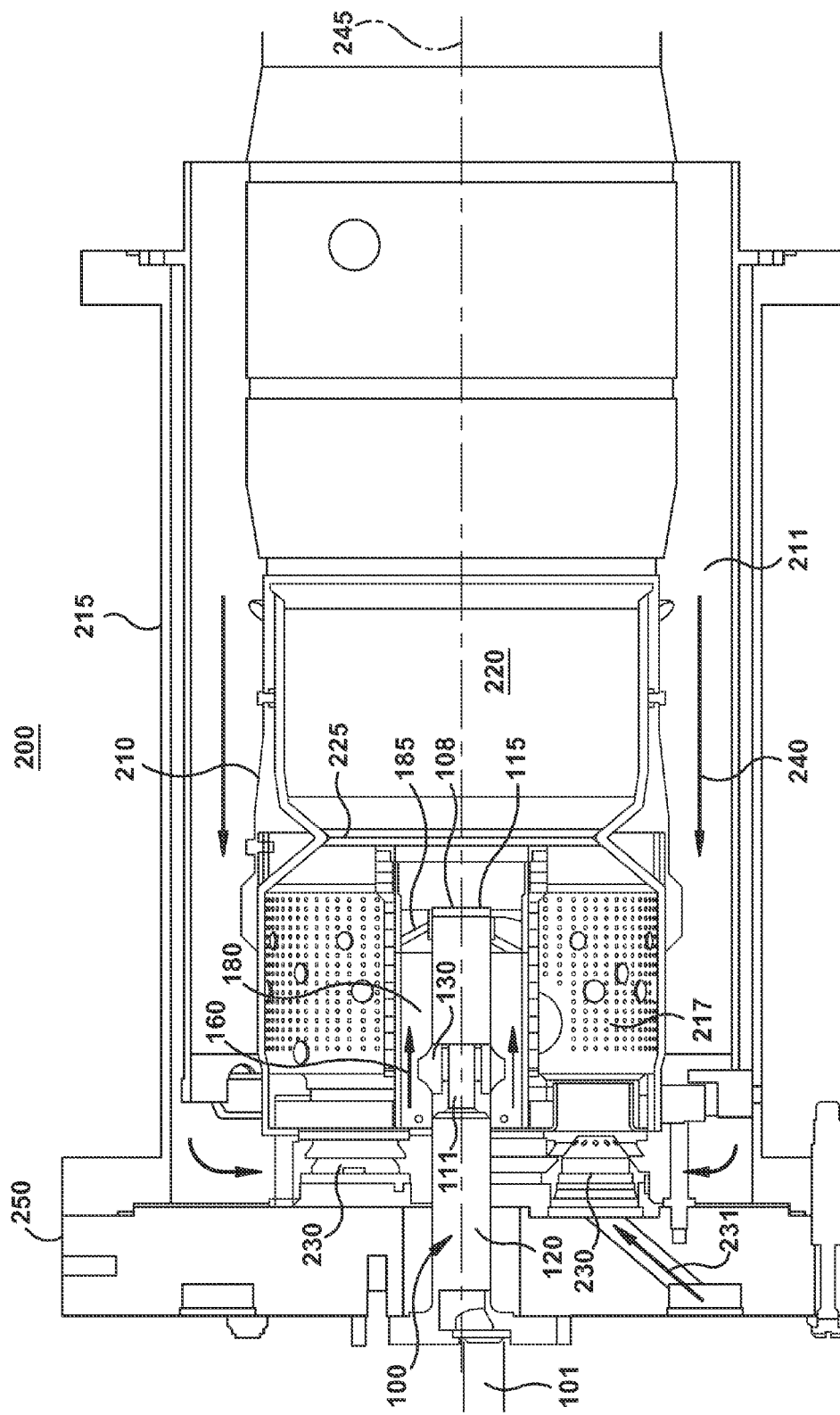
FIG. 11 illustrates an embodiment of a combustor for a gas turbine employing the inventive fuel injection manifold for a secondary fuel nozzle.

FIG. 11 illustrates a combustor 200 for a gas turbine that may employ the inventive fuel injection manifold 130 for a secondary fuel nozzle 100. Enhanced fuel premixing provided by the inventive fuel injection manifold 130 in the secondary fuel nozzle 100 for the combustion resulting in improved combustor performance and reduced emissions. Here, the combustor 200 comprises a liner 210 within combustor wall 215. The combustor includes a primary combustion chamber 215 and a secondary combustion chamber 220 adjacent to and downstream of primary combustion chamber 215 and separated by a venturi 225. At least one primary fuel nozzle 230 is positioned radially about a combustor centerline 245 to deliver fuel to primary combustion chamber 217. Secondary fuel nozzle 100 may be disposed along centerline 245, encircled by at least one primary fuel nozzle 230, and positioned to inject fuel towards secondary combustion chamber 220. Combustion air 240 is provided from compressor (not shown) and flows outside flow liner 210 in flow sleeve 211, supplying air to the at least one primary nozzle 230 and secondary fuel nozzle 100. Primary fuel nozzles 230 and secondary fuel nozzle 100 receive fuel from one or more fuel sources 231, 101 through backplate 250. The secondary fuel nozzle 100 shown with cutaway fuel injection manifold section may receive a first fuel source through center fuel passage 111 to the nozzle tip 108. As previously shown in FIG. 3, the nozzle tip also receives a cooling airflow from internal to the secondary fuel nozzle. Swirler 115 circumferentially outside nozzle tip 108 may swirl air passed from within secondary fuel nozzle promoting mixing of fuel and air at nozzle tip. Annular fuel injector manifold 130 receives premixing fuel internal to secondary fuel nozzle and injects premixing fuel into combustion airflow 160 of premixing space 180. Low radial protrusion of fuel injector manifold 130 into premixing space 180 and aerodynamic outer surface minimize pressure drop in premixing space 180. Fuel discharge openings on outer surface of fuel injector manifold 130 may be shaped, sized, oriented and numbered to promote mixing in the premixing space 180. A downstream swirler 185 may be positioned at discharge of premixing space 180 to further mix premix fuel-air with fuel-air mixture from nozzle tip 108.

While various embodiments are described herein, it will be appreciated from the specification that various combinations of elements, variations or improvements therein may be made, and are within the scope of the invention.

The invention claimed is:

1. A secondary fuel nozzle for a combustor of a gas turbine wherein the combustor provides a downstream combustion air flow within a fuel-air premixing space around the secondary fuel nozzle, the secondary fuel nozzle comprising:
   an elongated tube body with a fuel source end and a tip end;
   a unitary fuel injection manifold for premixing fuel with downstream combustion air flow, the fuel injection manifold being of a generally annual shape body shape within the elongated tube body and disposed between the fuel source end and the tip end, wherein the fuel injection manifold extends radially from internal to the elongated tube body to radially above and circumferentially fully around in a fuel-air premixing space external to the elongated tube body;

a fuel passage from a fuel source end of the elongated tube body to a proximity of the fuel injection manifold supplying premixing fuel to the unitary fuel injection manifold; and a plurality of fuel channels for fluid communication of the premixing fuel providing fluid communication between the premixing fuel passage within the elongated tube body and a plurality of fuel discharge outlets on the outer surface of the unitary fuel injection manifold, wherein the plurality of fuel channels are circumferentially organized around the body of the fuel injection manifold.

2. The secondary fuel nozzle of claim 1, further comprising:

a plurality of passages within the secondary fuel nozzle body, the passages being concentric with the unitary fuel injection manifold, wherein at least one of the passages supplies fuel and at least one of the passages supplies air from a fuel end of the to a tip end of the nozzle, wherein, the unitary fuel injection manifold includes a plurality of axial internal channels within the annular body allowing flow of at least one of the fuel and the air to the tip end of the nozzle.

3. The secondary fuel nozzle of claim 2, wherein the unitary fuel injection manifold extending above the elongated tube body is aerodynamically shaped and includes a smooth taper into an outer surface of the elongated tube body on the fuel source end and the tip end.

4. The secondary fuel nozzle of claim 3, wherein the fuel discharge outlets of the unitary fuel injection manifold are shaped and sized for promoting fuel-air mixing.

5. The secondary fuel nozzle of claim 4, wherein each of the plurality of fuel discharge outlets on the outer surface of the unitary fuel injection manifold comprise at least one hole discharging normal to the airflow in the premixing space.

6. The secondary fuel nozzle of claim 4, wherein each of the plurality of fuel discharge outlets on the outer surface of the unitary fuel injection manifold comprise at least slot discharging normal to the airflow in the premixing space.

7. The secondary fuel nozzle of claim 4, wherein each of the plurality of fuel discharge outlets on the outer surface of the unitary fuel injection manifold comprise at least slot discharging normal at an angle backward relative to the air flow in the premixing space.

8. The secondary fuel nozzle of claim 4, wherein each of the plurality of fuel discharge outlets on the outer surface of the unitary fuel injection manifold comprise at least slot discharging normal at an angle forward relative to the air flow in the premixing space.

9. The combustor of claim 8, wherein the fuel injection manifold further comprises a plurality of internal channels for fluid communication of at least one of a fuel and air being supplied from a fuel source end to the tip nozzle of elongated body tube of the secondary nozzle.

10. A combustor for a gas turbine including a turbine and a compressor, the combustor comprising:

a secondary fuel nozzle organized along an axial centerline of the combustor;

at least one primary fuel nozzle surrounding the secondary fuel nozzle;

a backplate supplying at least one fuel source to the at least one primary nozzle and the secondary fuel nozzle;

a combustion air supply from a compressor, wherein the combustion air supply is provided to the at least one primary fuel nozzle and the secondary nozzle;

the secondary fuel nozzle comprising:

an elongated body tube having a fuel supply end with an opposing tip end, the elongated body tube including a plurality of internal passages within a plurality of concentric tubes delivering air and fuel to a tip nozzle and to a tip swirler;

a unitary fuel injection manifold for premixing fuel with downstream combustion air flow, the fuel injection manifold being of a generally annual body shape within the elongated tube body and disposed between the fuel source end and the tip end, wherein the fuel injection manifold extends radially from internal to the elongated tube body to radially above and circumferentially fully around in a fuel-air premixing space external to the elongated tube body, and wherein the fuel injection manifold radially above the elongated tube body forms an aerodynamically streamlined outer surface for combustion air in the premixing space, the axial ends of the outer surface of the fuel injection manifold smoothly tapering for attachment to an outer radial surface of the elongated tube body;

a fuel passage from a fuel source end of the elongated tube body to a proximity of the fuel injection manifold supplying premixing fuel to the unitary fuel injection manifold; and a plurality of fuel channels for fluid communication of the premixing fuel providing fluid communication between the premixing fuel passage within the elongated tube body and a plurality of fuel discharge outlets on the outer surface of the unitary fuel injection manifold, wherein the plurality of fuel channels are circumferentially organized around the body of the fuel injection manifold.

11. The combustor of claim 10, wherein the fuel discharge outlets of the fuel injection manifold are disposed circumferentially around the annual fuel injection manifold wherein the size, shape, number and directional angle of the discharged premixing fuel promotes equivalence of fuel-air mixture in the premixing space.

12. The combustor of claim 11, wherein the fuel discharge outlets from each fuel channel in the fuel injection manifold comprise at least one hole discharging at least one of normal to or at an angle relative to combustion airflow.

13. The combustor of claim 11, wherein the fuel discharge outlets from each fuel channel in the fuel injection manifold comprise at least one slot discharging at least one of normal, at a forward angle relative to, and at a backward angle to combustion airflow.

14. A fuel injection manifold for a premixing fuel of a secondary fuel nozzle of a combustor of a gas turbine; the fuel injection manifold comprising:

a unitary body forming a generally annular segment of a nozzle tube for a secondary fuel nozzle of a gas turbine, the unitary body including an inner radial section for mounting within the nozzle tube and a radially elevated portion with an aerodynamically shaped outer surface for extending above the outer surface of the nozzle tube into a premixing space of the secondary fuel nozzle, wherein the unitary body is supplied with a premixing fuel source from within the nozzle tube; and a plurality of fuel channels in the unitary body establishing a fluid communication path for the premixing fuel from the fuel source within the nozzle tube to fuel discharge opening the premixing space radially surrounding the nozzle tube;

at least one fuel discharge outlet to the premixing space surrounding the nozzle tube for each of the plurality of the fuel channels, wherein the fuel discharge openings are adapted for enhancing mixing of the fuel with a combustion air flow located therein.

15. The fuel injection manifold of claim 14, further comprising a plurality of axial channels within the unitary body promoting flow of one of a fuel and air through the unitary body to a tip end of the nozzle tube.

16. The fuel injection manifold of claim 14, wherein the radial elevated portion at each axial end smoothly tapers to an outer diameter for attachment to the nozzle tube.

17. The fuel injection manifold of claim 14, wherein the fuel discharge outlet to the premixing space from each fuel injection passage comprises:
   at least one hole discharging normally into the airflow within the premixing space.

18. The fuel injection manifold of claim 14, wherein the fuel discharge outlet to the premixing space from each fuel injection passage comprises:
   at least one slot discharging normally into the airflow within the premixing space.

19. The fuel injection manifold of claim 14, wherein the fuel discharge outlet to the premixing space from each fuel injection passage comprises:
   at least one slot discharging into the airflow within the premixing space at an angle of at least one of forward and backward relative to the airflow.

\* \* \* \* \*

UNITED STATES PATENT AND TRADEMARK OFFICE
CERTIFICATE OF CORRECTION

PATENT NO. : 8,661,825 B2
APPLICATION NO. : 12/971312
DATED : March 4, 2014
INVENTOR(S) : Desai et al.

It is certified that error appears in the above-identified patent and that said Letters Patent is hereby corrected as shown below:

On the Title Page, item (74), under "Attorney, Agent, or Firm", in Column 2, Line 1, delete "Ernst G. Cusick;" and insert -- Ernest G. Cusick; --, therefor.

In the Specification

In Column 3, Line 49, delete "illustrates FIG." and insert -- illustrates --, therefor.

In Column 5, Line 5, delete "surface of 147" and insert -- surface 147 --, therefor.

In Column 6, Lines 36-37, delete "fuel passage 111" and insert -- fuel passage 110 --, therefor.

Signed and Sealed this
Eighth Day of July, 2014

Michelle K. Lee
*Deputy Director of the United States Patent and Trademark Office*